(12) United States Patent
Nishioka et al.

(10) Patent No.: US 10,718,425 B2
(45) Date of Patent: Jul. 21, 2020

(54) BRAKE DEVICE OF TRANSMISSION

(71) Applicant: Mazda Motor Corporation, Aki-gun, Hiroshima (JP)

(72) Inventors: Takashi Nishioka, Hiroshima (JP); Tatsuhiko Iwasaki, Hiroshima (JP); Norio Iwashita, Hiroshima (JP); Tomotaka Ishizaka, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 219 days.

(21) Appl. No.: 15/939,577

(22) Filed: Mar. 29, 2018

(65) Prior Publication Data

US 2018/0340605 A1   Nov. 29, 2018

(30) Foreign Application Priority Data

May 24, 2017   (JP) .................. 2017-102262

(51) Int. Cl.
*F16H 57/04* (2010.01)
*B60T 5/00* (2006.01)
(Continued)

(52) U.S. Cl.
CPC .......... *F16H 57/0473* (2013.01); *B60T 1/062* (2013.01); *B60T 5/00* (2013.01); *F16D 55/40* (2013.01); *F16D 65/122* (2013.01); *F16D 65/128* (2013.01); *F16D 65/853* (2013.01); *F16D 67/04* (2013.01); *F16H 57/0423* (2013.01); *F16H 57/0424* (2013.01); *F16H 57/0484* (2013.01); *F16H 57/10* (2013.01); *F16H 63/3026* (2013.01); *F16D 2121/04* (2013.01); *F16H 3/66* (2013.01); *F16H 3/666* (2013.01); *F16H 2063/3033* (2013.01);
(Continued)

(58) Field of Classification Search
None
See application file for complete search history.

(56) References Cited

U.S. PATENT DOCUMENTS

| 6,202,814 | B1 * | 3/2001 | Braford, Jr. | .......... F16D 25/0638 |
| | | | | 188/264 E |
| 2009/0308709 | A1 * | 12/2009 | Haupt | ................... F16D 65/853 |
| | | | | 192/221 |
| 2017/0067553 | A1 * | 3/2017 | Sako | ......................... F16H 3/66 |

FOREIGN PATENT DOCUMENTS

| DE | 102011005132 | * | 9/2012 |
| JP | 64021829 U | | 2/1989 |
| JP | 2016090048 A | | 5/2016 |

* cited by examiner

*Primary Examiner* — Mark A Manley
(74) *Attorney, Agent, or Firm* — Alleman Hall Creasman & Tuttle LLP

(57) ABSTRACT

In a brake device of a transmission, rotation side friction plates are engaged with a cylindrical part of a rotation side holding member, and fixed side friction plates are engaged with a spline part that is provided on an outer peripheral surface of an inner cylindrical part of a fixed side holding member opposed to a cylindrical part of the rotation side holding member. The fixed side holding member includes an inflow oil passage that supplies lubricating oil from the outside to the inside of the radial direction thereof. An annular space communicating with an inflow oil passage is provided on the inside of the cylindrical part of the fixed side holding member. Oil discharge holes supplying lubricating oil, which was flowed into the annular space, to the rotation side and fixed side friction plates are provided on the cylindrical part of the fixed side holding member.

6 Claims, 10 Drawing Sheets

(51) Int. Cl.
*B60T 1/06* (2006.01)
*F16H 57/10* (2006.01)
*F16D 65/12* (2006.01)
*F16H 63/30* (2006.01)
*F16D 65/853* (2006.01)
*F16D 67/04* (2006.01)
*F16D 55/40* (2006.01)
*F16H 3/66* (2006.01)
*F16D 65/14* (2006.01)
*F16D 65/00* (2006.01)
*F16D 121/04* (2012.01)

(52) U.S. Cl.
CPC .................. *F16H 2200/006* (2013.01); *F16H 2200/2012* (2013.01); *F16H 2200/2043* (2013.01)

|  | CL1 | CL2 | CL3 | BR1 | BR2 |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

Fig. 2

BRAKE DEVICE OF TRANSMISSION

FIELD OF THE INVENTION

The present invention relates to a brake device of a transmission mounted on a vehicle such as an automobile and belongs to a technical field of a transmission for an automobile.

BACKGROUND ART

Although a transmission mounted on a vehicle such as an automatic transmission in general includes a plurality of planetary gear sets and a plurality of hydraulic pressure type frictional engagement elements of a clutch or a brake and is configured to realize a plurality of forward gear shift stages and usually one stage of reverse gear shift, in recent years, as a purpose of the improvement of traveling performance and fuel economy performance of an engine or the reduction of power consumption of a driving motor, the shift shock tends to be moderated by multistaging the transmission.

To meet the requirements for multistaging and reducing weight of such an automatic transmission, a torque converter tends to be abolished, and in this case, by causing the part of the frictional engagement elements that form a first gear ratio to slip, smooth start may be realized while avoiding an engine stall. In that case, since the controllability when engaging is better for a brake in which a hydraulic chamber does not rotate compared with a clutch in which the hydraulic chamber does rotate, executing a slip control of a starting brake might be considered.

However, for conventional brakes, a fixed side friction plate is unrotatably fixed on an inner peripheral surface of a case of the transmission, in which a brake and the like are housed, and a rotation side friction plate and a rotator holding the rotation side friction plate are provided further inward in the radial direction than the fixed side friction plate.

For an automatic transmission configured like this, as the slip control executed by the start brake increases becomes more frequent and as the duration of slip control becomes longer, heating of the friction plate caused by slip needs to be suppressed effectively in order to maintain a desired durability.

To address this, it might be considered to increase the amount of lubricating oil for lubricating the start brake to thereby improve the cooling of the start brake. However, in order to increase the amount of lubricating oil that is supplied, the capacity of the pump that discharges the lubricating oil needs to be made larger, and this would result in the deterioration of fuel economy.

To address problems like these, as shown in FIG. 10 in PATENT DOCUMENT 1, a brake device 200 is disclosed that includes a rotation side holding member 202 that is rotatable and has a cylindrical shape and holds a rotation side friction plate 201, a fixed side holding member 204 that is non-rotatable and has a cylindrical shape and holds a fixed side friction plate 203 that engages and releases to the rotation side friction plate 201, and a lubricating oil supply oil passage 205 as an inflow oil passage supplying lubricating oil to the rotation side friction plate 201 and the fixed side friction plate 203. The rotation side holding member 202 includes an inner peripheral surface 204a at a position that is further outside in a radial direction than the fixed side holding member 204, and the fixed side friction plate 203 is engaged with the inner peripheral surface 204a of the fixed side holding member 204 by a spline.

A spline groove 204b on the inner peripheral surface 204a of the fixed side holding member 204 is provided so as to communicate with the inflow oil passage 205, and the lubricating oil is introduced from the inflow oil passage 205 to the spline groove 204b of the fixed side holding member 204 and moves along the spline groove 204b as shown by an arrow q. This lubricating oil then moves to the outside in the radial direction upon experiencing the centrifugal force of the rotation side friction plate 201 and is supplied between each of the friction plates 201 and 203. In this manner, during the slip control when frictional heat is generated between the rotation side friction plate 201 and the fixed side friction plate 203, each of the friction plates 201 and 203 is cooled by lubricating oil supplied from the inflow oil passage 205.

RELATED ART

Patent Document

[Patent Document 1]
Japanese Unexamined Patent Application Publication 2016-90048

SUMMARY OF THE INVENTION

Problems to be Solved by the Invention

However, in the brake device 200 of the transmission according to PATENT DOCUMENT 1, as shown in FIG. 10, since on the inflow oil passage 205 side of the friction plates 201, 203, at a location where the friction plates 201, 203 reach the spline groove 204b, there is open space, it is conceivable that lubricating oil could flow out to a space Q in which the friction plates 201, 203 are provided, before flowing from the inflow oil passage 205 into the area where the friction plates 201, 203 engage the spline groove 204b, and this could result in inefficient cooling of the friction plates 201, 203.

Therefore, depending on the type of vehicle, the amount of lubricating oil for the start brake might be insufficient, and enlargement of the pump for the lubricating oil supply may be considered to address this; however, such a modification could cause the fuel economy of the vehicle to deteriorate as described above.

Thus, by efficiently supplying lubricating oil to the brake device of the transmission, both improvement of fuel economy and maintenance of durability of the friction plates can be achieved.

BRIEF SUMMARY OF THE INVENTION

In order to address the problems described above, a brake device of a transmission according to the present invention may be configured as described below.

According to one configuration of the present invention, a brake device of a transmission comprises a rotatable cylindrical shape rotation side holding member for holding a rotation side friction plate inside, and a non-rotatable fixed side holding member having a cylindrical part being arranged thereinside for holding a fixed side friction plate outside, wherein the fixed side holding member has an inflow oil passage that supplies lubricating oil from the outside in a radial direction to the cylindrical part side, wherein an annular space communicating with the inflow oil passage is provided inside of the cylindrical part of the fixed side holding member, and wherein an oil discharge hole for supplying lubricating oil, which is flowed into the annular space, to the friction plates, is provided on the cylindrical part of the fixed side holding member.

According to this configuration, while lubricating oil of the brake device of the transmission is introduced from the outside of the fixed side holding member to the cylindrical part side passing through the inflow oil passage into the annular space that is a closed space, it is spread into the annular space without outflowing from the inside of the annular space. Moreover, nearly the entire amount of the lubricating oil introduced into the annular space is reliably supplied to the friction plate that is provided on the outside of an inner peripheral wall. As a result, for example, compared with the brake device disclosed in FIG. 9 of PATENT DOCUMENT 1 described above, the supply amount of lubricating oil to the friction plate can be reliably secured. Furthermore, the annular space may be formed by a single fixed side holding member or may be formed by two members.

Further in this configuration, an annular member may be fitted into an inside of a cylindrical part of the fixed side holding member, and a circumferential direction groove may be provided on an inner peripheral surface of the cylindrical part or an outer peripheral surface of the annular member, and the annular space may be formed in an oil-tight state between the inner peripheral surface of the cylindrical part and the outer peripheral surface of the annular member.

According to this configuration, a fixed side unit, which is formed by a fixed side holding member of the outer peripheral side and an annular member of the inner peripheral side, may be divided into two members (namely, the fixed side holding member and the annular member of the inner peripheral side), and also may be configured by fitting the annular member into the fixed side holding member, so that the annular space can be in an oil-tight state that is easily formed in the annular space with a simple structure.

Further in this configuration, the brake device may comprise a piston for pressing the friction plates, wherein a hydraulic oil passage of the piston is provided on the fixed side holding member and the annular member, and an upstream part thereof is formed by the fixed side holding member and a downstream part thereof is formed by the annular member, and the upstream part and the downstream part of the hydraulic oil passage communicate with the annular space in a separated state.

According to this configuration, the hydraulic oil passage for operating the piston that presses the friction plate of the brake device can prevent mixing of hydraulic oil and lubricating oil respectively supplied from the hydraulic oil passages, which are respectively different oil passages for different purposes, and the annular space, with a simple structure, since the upstream part thereof is formed by the fixed side holding member, the downstream part thereof is formed by the annular member, and the upstream part and the downstream part of the hydraulic oil passage communicate with the annular space in a separated state.

Further in this configuration, the fixed side holding member and the annular member may be integrated by press-fitting.

According to this configuration, since the fixed side holding member and the annular member are integrated by press-fitting, an oil-tight state in the annular space can be secured.

Further in this configuration, a communicating part for communicating with an upstream part and a downstream part of the hydraulic oil passage in the annular space may be provided on a surface of a side, on which a circumferential direction groove is provided among an inner peripheral surface of a cylindrical part of the fixed side holding member and an outer peripheral surface of the annular member, and a wall part may be provided on the communicating part for partitioning between the hydraulic oil passage and the annular space.

According this configuration, since a communicating part for communicating with the upstream part and the downstream part of the hydraulic oil passage in the annular space is provided on a surface of a side on which a circumferential direction groove is provided, among an inner peripheral surface of a cylindrical part of the fixed side holding member and an outer peripheral surface of the annular member, and a wall part is provided on the communicating part for partitioning between the hydraulic oil passage and the annular space, the wall part is also press fitted to a counter surface opposed to the wall part when the fixed side holding member and the annular member are press fitted. Accordingly, since the hydraulic oil passage and the annular space are separated, mixing the hydraulic oil of the piston with lubricating oil of the friction plate is more reliably prevented.

Further in this configuration, the hydraulic oil passage may include an engagement oil passage for engaging the friction plate and a release oil passage for releasing the friction plate, and the engagement oil passage and the release oil passage may be arranged at different positions in a circumferential direction.

According to this configuration, since the hydraulic oil passage has an engagement oil passage for engaging the friction plate and a release oil passage for releasing the friction plate, and the engagement oil passage and the release oil passage are arranged at different positions in a circumferential direction, the engagement oil passage, the release oil passage, and the annular space, which are three oil passages having different purposes, are formed by two oil passages extending in the radial direction having different positions in the circumferential direction and an oil passage circling in the circumferential direction, and the oil passages are provided without running into each other. As a result, the hydraulic oil for engaging, the hydraulic oil for releasing, and lubricating oil of the friction plate are separated without mixing, with a simple structure.

Further in this configuration, the brake device may be a start brake provided on the transmission.

According to this configuration, since the brake device is a start brake provided on the transmission, lubrication performance of the start brake can be ensured, which is necessary to improve the lubrication performance when performing slip control, while enlargement of a pump can be prevented.

BRIEF DESCRIPTION OF THE DRAWINGS

FIG. 2 is an engagement table of the automatic transmission in FIG. 1.

DETAILED DESCRIPTION OF THE EMBODIMENTS

Hereinafter, an embodiment of the present invention will be described.

Figure 1:
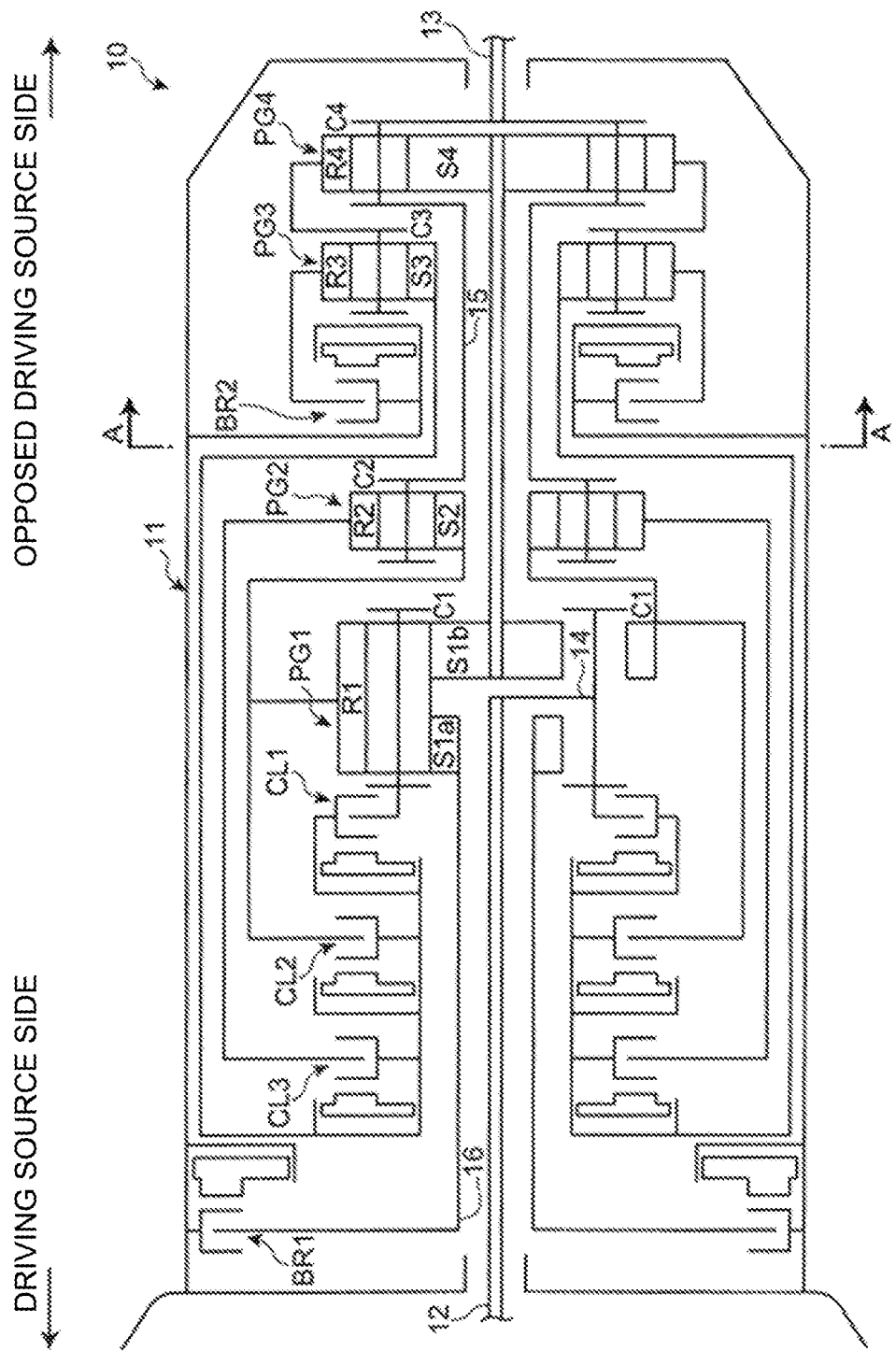
FIG. 1 is a schematic diagram of an automatic transmission according to an embodiment of the present invention.

FIG. 1 is a schematic diagram showing a configuration of an automatic transmission in which a brake device has been applied according to an embodiment of the present invention. As shown, automatic transmission 10 is a vertically arranged type automatic transmission that has an input axis 12 provided on a driving source side (left side of the figure) inside of a transmission case 11 and an output axis 13 provided on an opposed driving source side (right side of the figure). Moreover, the input axis 12 and the output axis 13 are arranged coaxially. On axial centers of the input axis 12 and the output axis 13, first, second, third, and fourth planetary gear sets (hereinafter, simply referred to as a first, second, third, and fourth gear sets) PG1, PG2, PG3, and PG4 are arranged from the driving source side.

Moreover, in this automatic transmission 10 as shown in FIG. 1, a first clutch CL1 is provided on the driving source side of the first gear set PG1 in the transmission case 11, a second clutch CL2 is provided on the driving source side of the first clutch CL1, and a third clutch CL3 is provided on the driving source side of the second clutch CL2. Moreover, a first brake BR1 is provided on the driving source side of the third clutch CL3 and a second brake BR2 is provided on the driving source side of the third gear set PG3. Thus, components of the automatic transmission 10 (the first to the fourth gear sets PG1 to PG4, the first to the third clutches CL1 to CL3, and the first and the second brakes BR1 and BR2) are arranged in an axial direction from the driving source side, in the order of the first brake BR1, the third clutch CL3, the second clutch CL2, the first clutch CL1, and the second brake BR2.

Any of the first to the fourth gear sets PG1 to PG4 may be a single pinion type in which a pinion supported by a carrier is directly meshed with a sun gear and a ring gear. As a rotational element, the first gear set PG1 has a first sun gear S1, a first ring gear R1, and a first carrier C1. The second gear set PG2 has a second sun gear S2, a second ring gear R2, and a second carrier C2. The third gear set PG3 has a third sun gear S3, a third ring gear R3, and a third carrier C3. The fourth gear set PG4 has a fourth sun gear S4, a fourth ring gear R4, and a fourth carrier C4.

Moreover, the first gear set PG1 is a double sun gear type in which the first sun gear S1 is divided into two in the axial direction. Therefore, the first sun gear S1 is configured by a front side of the first sun gear S1a provided on the driving source side in the axial direction and a rear side of the first sun gear S1b provided on the opposed driving source side. Since a pair of the first sun gears S1a and S1b have the same number of teeth and are meshed with the same pinion supported by the first carrier C1, the rotation speed of these first sun gears S1a and S1b are always the same. Therefore, the pair of first sun gears S1a and S1b always rotate at the same speed, and when rotation of one is stopped, the other rotation is also stopped.

In the automatic transmission 10, the first sun gear S1 (specifically, the rear side of the first sun gear S1b) and the fourth sun gear S4, the first ring gear R1 and the second sun gear S2, the second carrier C2 and the fourth carrier C4, and the third carrier C3 and the fourth ring gear R4 are constantly connected respectively. Then, the input axis 12 and the first carrier C1, and the output axis 13 and the fourth carrier C4 are constantly connected respectively. Specifically, the input axis 12 is coupled with the first carrier C1 via a power transmission member 14 that passes between the pair of the first sun gears S1a and S1b, and the fourth carrier C4 and the second carrier C2 are coupled via a power transmission member 15.

Furthermore, the first clutch CL1 is provided between the input axis 12 and the first carrier C1 and the third sun gear S3 and disconnects them, the second clutch CL2 is provided between the first ring gear R1 and the second sun gear S2 and the third sun gear S3 and disconnects these, and the third clutch CL3 is provided between the second ring gear R2 and the third sun gear S3 and disconnects these.

The first brake BR1 disconnects the transmission case 11 and the first sun gear S1 (more specifically, the front side of the first sun gear S1a). The second brake BR2 disconnects the transmission case 11 and the third ring gear R3.

Moreover, the first brake BR1 is provided between the transmission case 11 and the first sun gear S1 (specifically, the front side of the first sun gear S1a) and disconnects them, and the second brake BR2 is provided between the transmission case 11 and the third ring gear R3 and disconnects them. Regarding the first and the second brakes BR1 and BR2, the outer peripheral side of the friction plate that is engaged and released according to routing of hydraulic pressure is integrated into the transmission case 11 and the inside rotational members provided on the inner peripheral side of the friction plate are coupled with the first sun gear S1 and the third ring gear R3 respectively. The inside rotational members of the first brake BR1 are directly coupled with the rear side of the first sun gear S1a among the pair of first sun gears S1a and S1b via the power transmission members 16.

Moreover, a friction plate between two rotational cylindrical members, a piston engaging the friction plate, and a hydraulic chamber operating the piston are provided in each of the first, second, and third clutches CL1, CL2, and CL3. Furthermore, a fixed side holding member, a friction plate between the rotation side holding member, a piston engaging the friction plate, and a hydraulic chamber operating the piston are provided in each of the first and the second brakes BR1 and BR2.

With the above configuration, according to this automatic transmission 10, as shown in an engagement table of FIG. 2, by selectively engaging three of the frictional engagement elements among the five frictional engagement elements, first to eighth forward gear ratios and a reverse gear ratio may be formed.

Specifically, a first gear ratio is formed when the first clutch CL1, the first brake BR1, and the second brake BR2 are engaged, a second gear ratio is formed when the second clutch CL2, the first brake BR1, and the second brake BR2 are engaged, a third gear ratio is formed when the first clutch CL1, the second clutch CL2, and the second brake BR2 are engaged, a fourth gear ratio is formed when the second clutch CL2, the third clutch CL3, the second brake BR2 are engaged, a fifth gear ratio is formed when the first clutch CL1, the third clutch CL3, and the second brake BR2 are engaged, a sixth gear ratio is formed when the first clutch CL1, the second clutch CL2, and the third clutch CL3 are engaged, a seventh gear ratio is formed when the first clutch CL1, third clutch CL3, and the first brake BR1 are engaged, an eighth gear ratio is formed when the second clutch CL2, the third clutch CL3, and the first brake BR1 are engaged, and a reverse gear ratio is formed when the third clutch CL3, the first brake BR1, and the second brake BR2 are engaged.

Since the second brake BR2 connected to the third gear set PG3 in this embodiment corresponds to a brake device generally according to the present invention, the configuration of the second brake BR2 will be described hereinafter with reference to FIG. 3 to FIG. 5.

Figure 3:
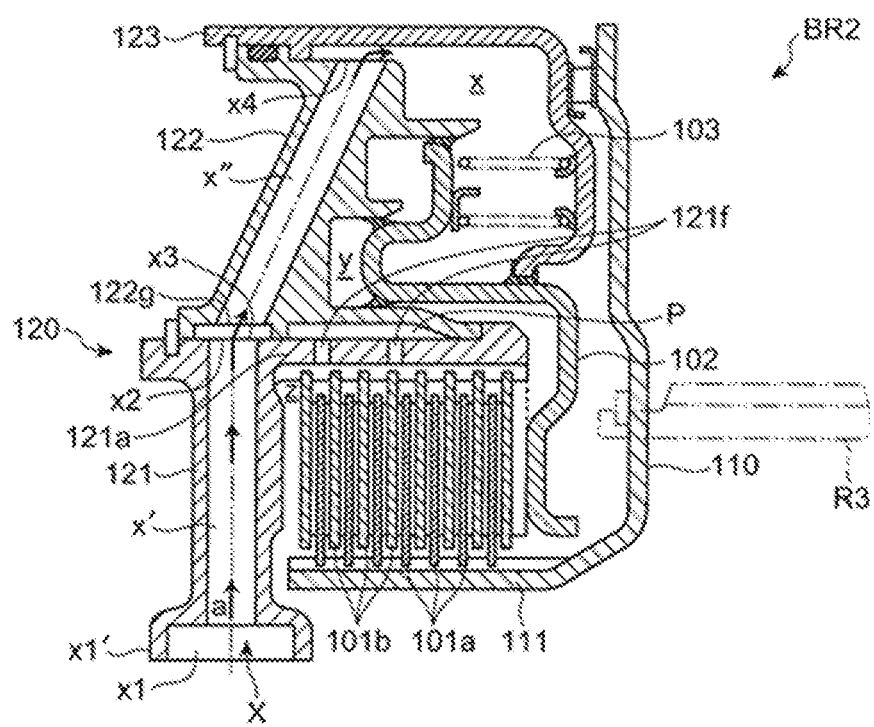
FIG. 3 is a B-C-D sectional view of FIG. 9.
Figure 4:
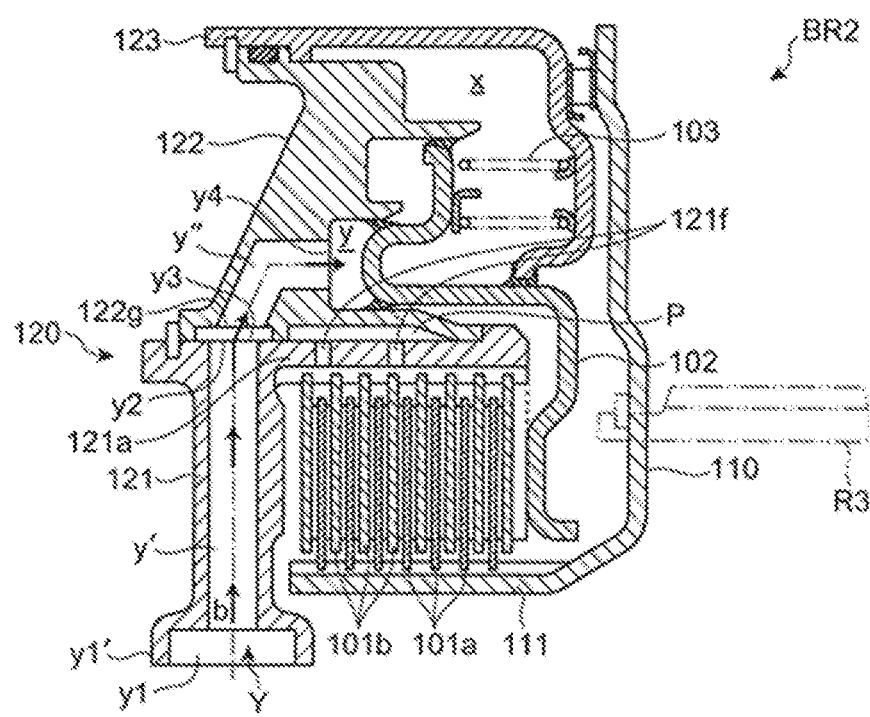
FIG. 4 is a B-E-F sectional view of FIG. 9.
Figure 5:
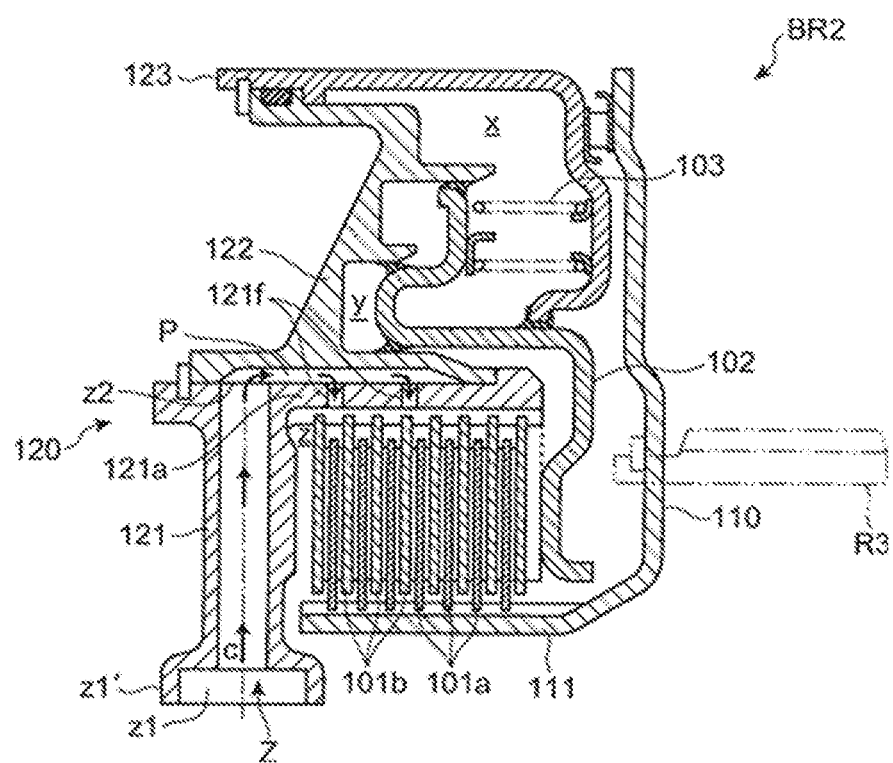
FIG. 5 is a B-G sectional view of FIG. 9.

The rotation side holding member 110 of the outer peripheral side and the fixed side holding member 121 of the inner peripheral side are provided on the second brake BR2 as shown in FIG. 3 to FIG. 5, the rotation side holding member 110 and the fixed side holding member 121 includes cylindrical parts 111 and 121a respectively, the inner peripheral side of the cylindrical part 111 of the rotation side holding member 110 and the outer peripheral side of the cylindrical part 121a of the fixed side holding member 121 are provided oppositely, the rotation side friction plates 101a, 101a are spline-engaged with the inner peripheral surface of the rotation side holding member 110, the fixed side friction plates 101b, 101b are spline-engaged with the outer peripheral surface of the cylindrical part 121a of the fixed side holding member 121, and these friction plates 101a, 101a and 101b, 101b are arranged alternately.

An annular member 122 that is fitted in the inner peripheral side of the fixed side holding member 121 and a seal member 123 that is fitted in the inner peripheral side of the annular member are provided on the fixed side holding member 121, and in this arrangement form a fixed side unit 120.

A piston 102 to engage the friction plates 101a and 101b is held between the rotation side holding member 110 and the fixed side unit 120. The outer peripheral side of the piston 102 is provided in proximity to the friction plates 101a and 101b, and also provided between the annular member 122 and the seal member 123.

An engagement hydraulic chamber x for engaging the friction plates 101a and 101b is formed between the inner peripheral side of the piston 102 and the seal member 123, and a release hydraulic chamber y for releasing the friction plates 101a and 101b is formed between the inner peripheral side of the piston 102 and the annular member 122.

A spring 103 for clearance adjustment to maintain a constant gap between the friction plates 101a and 101b is held between the inner peripheral side of the piston 102 and the seal member 123.

An engagement oil passage X as a hydraulic oil passage of the piston 102 communicating with the engagement hydraulic chamber x (FIG. 3), a release oil passage Y as a hydraulic oil passage of the piston 102 communicating with the release hydraulic chamber y (FIG. 4), and an inflow oil passage Z inflowing lubricating oil to lubricate the friction plate (FIG. 5) are provided on the fixed side unit 120.

Next, each member configuring the three oil passages X, Y, and Z will be described with reference to FIG. 6A to FIG. 8B.

Figure 6A:
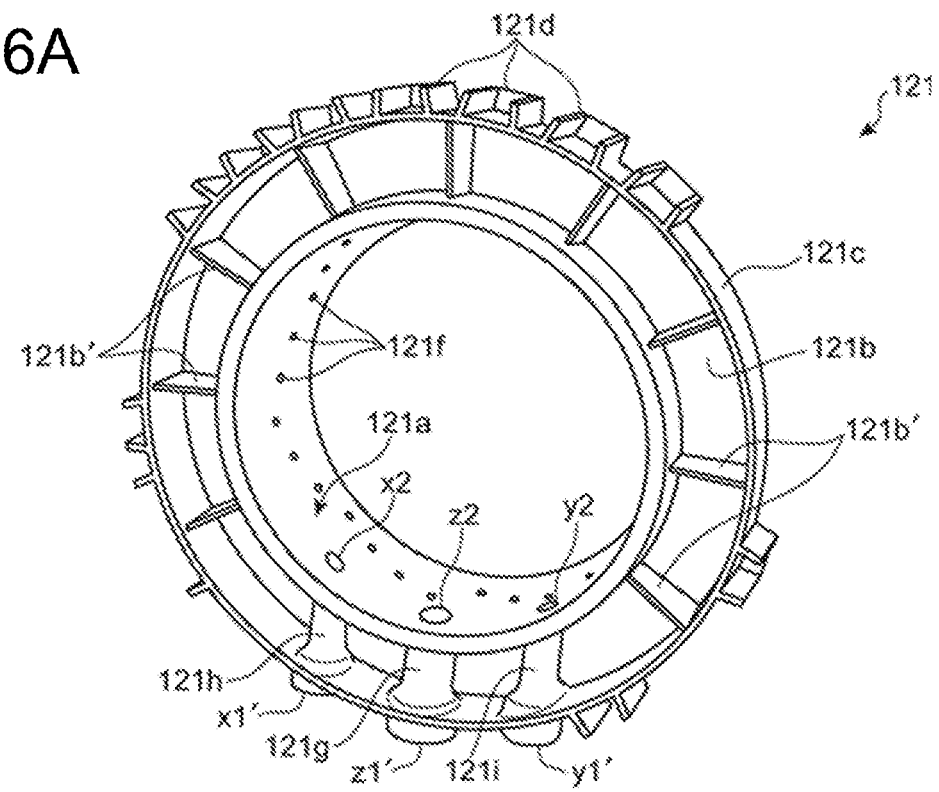
FIGS. 6A and 6B are views of a fixed side holding member according to an embodiment of the present invention.
Figure 6B:
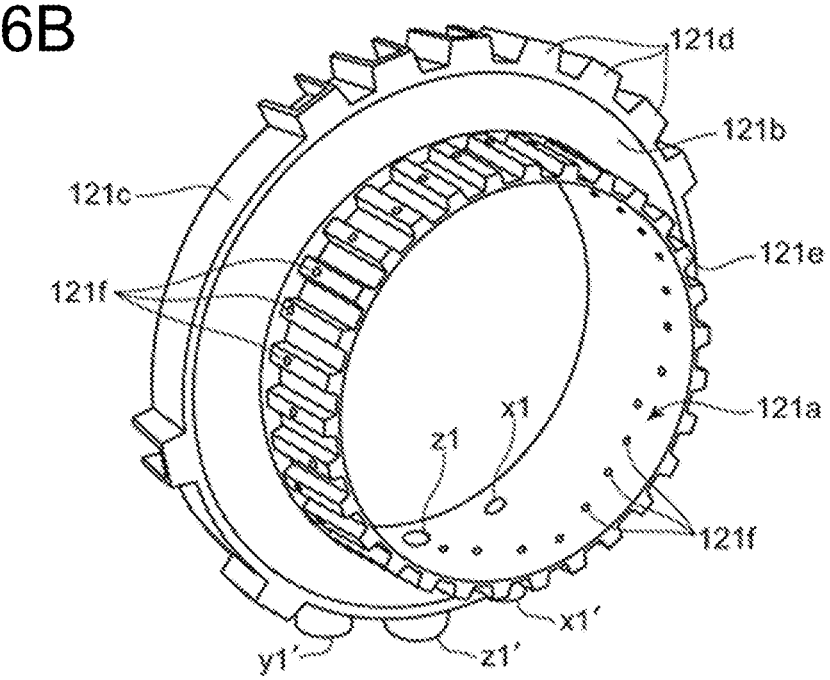

First of all, as shown in FIGS. 6A and 6B, an inner cylindrical part 121a (which also simply may be referred to as a cylindrical part), a vertical surface part 121b extending from a part closer to the opposite piston 102 in the axial direction on the outer peripheral surface of the inner cylindrical part 121a to the outside in the radial direction, and an outer cylindrical part 121c extending from an end part of the outside in the radial direction of the vertical surface part 121b to the opposite piston 102 side in the axial direction, are provided on the fixed side holding member 121 of the fixed side unit 120.

A plurality of spline teeth 121d, 121d to be fixed to the transmission case 11 are provided over the entire circumference on the outer peripheral surface of the outer cylindrical part 121c.

A spline part 121e is provided on the outer peripheral surface of the inner cylindrical part 121a from the vertical surface part 121b toward the piston 102 side, in which splines to be engaged with the fixed side friction plates 101b, 101b are formed over the entire circumference of the outer peripheral surface.

A plurality of oil discharge holes 121f, 121f that penetrate the outer peripheral surface and the inner peripheral surface of the inner cylindrical part 121a are provided over the whole circumference of the spline part 121e of the inner cylindrical part 121a, and the plurality of oil discharge holes 121f, 121f are arranged at different positions in the axial direction.

A bulging part 121g, which extends in the radial direction along the vertical surface part 121b between the inner cylindrical part 121a and the outer cylindrical part 121c, is provided in a central part of lower portion of the outer peripheral surface on the side opposite piston 102 across the vertical surface part 121b to the inner cylindrical part 121a of the fixed side holding member 121. Bulging parts 121h and 121i extend in parallel on the each side of the bulging part 121g.

In the bulging parts 121h and 121i, the upstream side oil passages x' and y' of the engagement oil passage X and the release oil passage Y are formed to penetrate therethrough, and the oil passage Z is formed to penetrate through the bulging part 121g. Opening parts x1, y1, and z1, on the side of the outer cylindrical part 121c of the oil passages x', y', and Z, are surrounded by boss parts x1', y1', and z1' (with reference to FIG. 3 to FIG. 5).

A plurality of ribs 121b', 121b' are provided at approximately equal intervals in the circumferential direction in order to secure rigidity of the vertical surface part 121b on the surface of the vertical surface part 121b on the side opposite piston 102. The ribs 121b', 121b' are formed extending in the radial direction between the inner cylindrical part 121a and the outer cylindrical part 121c.

Figure 7A:
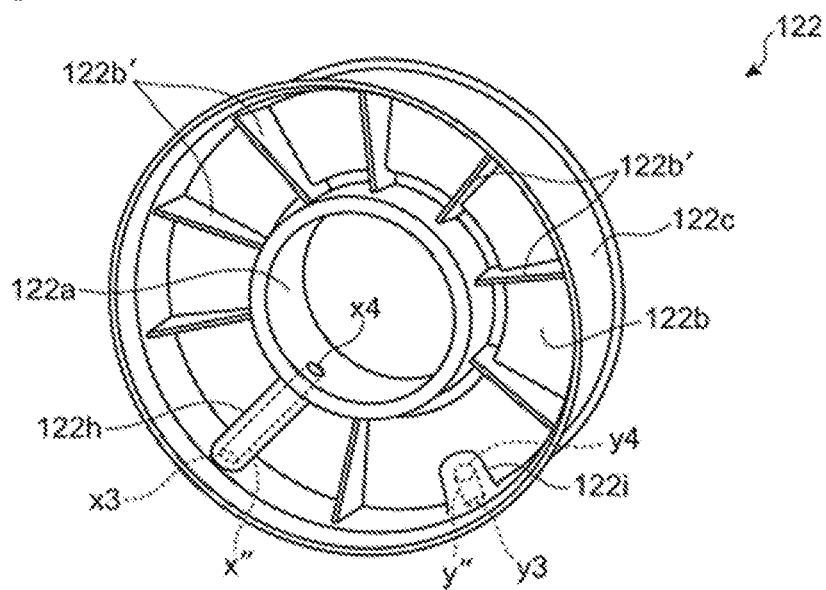
FIGS. 7A and 7B are views of an annular member according to an embodiment of the present invention.
Figure 7B:
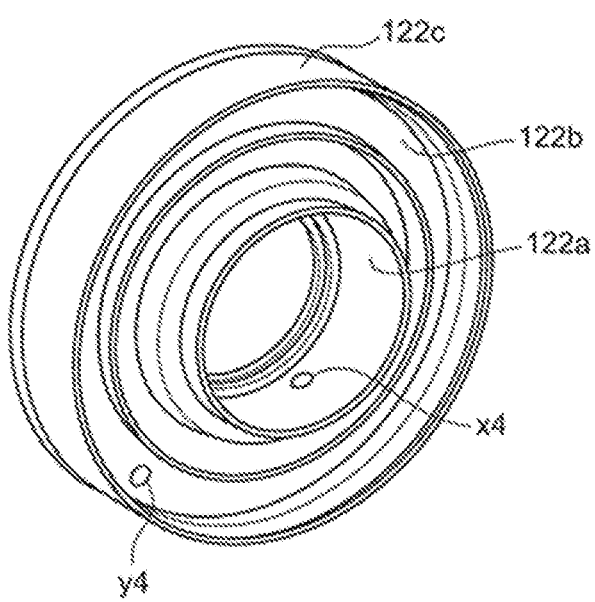

Next, as shown in FIGS. 7A and 7B, an inner cylindrical part 122a, a vertical surface part 122b that extends from a central part in the axial direction of the inner cylindrical part 122a outward in the radial direction, and an outer cylindrical part 122c that extends from a radially outermost part of the vertical surface part 122b toward the side opposite piston 102 in the axial direction, are provided on the annular member 122 of the fixed side unit 120.

A plurality of ribs 121b', 121b' are provided at approximately equal intervals in the circumferential direction in order to secure rigidity of the vertical surface part 121b on the side of the vertical surface part 121b opposite piston 102. The ribs 121b', 121b' are formed extending in the radial direction between the inner cylindrical part 121a and the outer cylindrical part 121c.

A bulging part 122h, which extends in the radial direction throughout the area between the inner cylindrical part 122a and the outer cylindrical part 122c along the vertical surface part 122b, is provided on a lower part of the outer peripheral surface of the side opposite piston 102 across the vertical surface part 122b to the inner cylindrical part 122a of the annular member 122 and also is located at a position corresponding to the bulging part 121*h* of the fixed side holding member 121.

A bulging part 122*i* that expands from the outer cylindrical part 122*c* to a radially middle part of the vertical surface part 122*b* is provided at a position corresponding to the bulging part 121*i* of the fixed side holding member 121.

In the bulging parts 122*h* and 122*i*, downstream side oil passages x" and y" of the engagement oil passage X and the release oil passage Y are formed to penetrate therethrough. An opening part x2 on the inner cylindrical part 121*a* side of the upstream side oil passage x' of the engagement oil passage X and an opening part x3 on the outer cylindrical part 122*c* side of the downstream side oil passage x" of the engagement oil passage X are arranged at corresponding positions, and an opening part x4 on the inner cylindrical part 122*a* side of the downstream side oil passage x" of the engagement oil passage X is provided, so as to communicate with the hydraulic chamber x for engagement (with reference to FIG. 3).

On the other hand, an opening part y2 on the inner cylindrical part 121*a* side of the upstream side oil passage y' of the release oil passage Y and an opening part y3 on the outer cylindrical part 122*c* side of the downstream side oil passage y" of the release oil passage Y are arranged at corresponding positions, the downstream side oil passage y" of the release oil passage Y extends from the opening part y3 on the outer cylindrical part 122*c* side of the annular member 122 to the inner side in the radial direction and then extends in the axial direction, and an opening part y4, which opens so as to face to the hydraulic chamber y, is provided (with reference to FIG. 4).

Figure 8A:
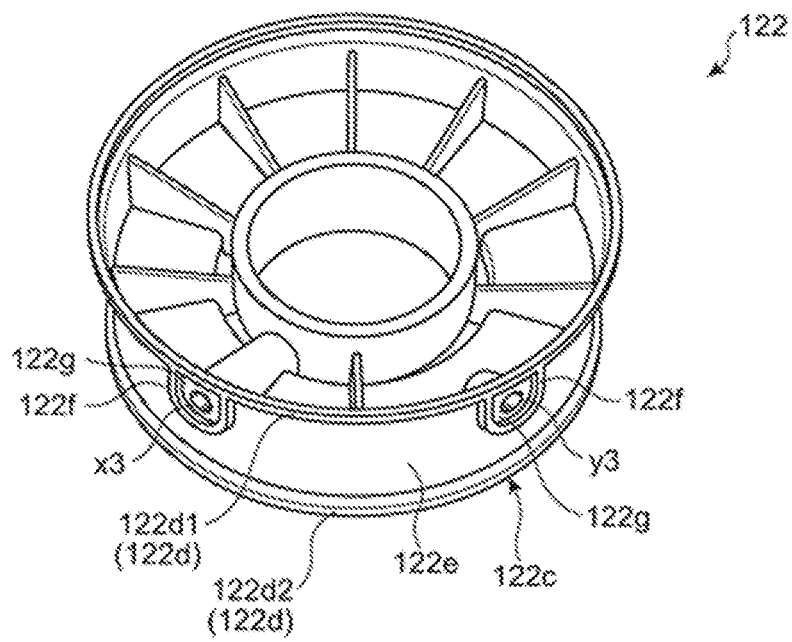
FIGS. 8A and 8B are views of an annular member according to an embodiment of the present invention.
Figure 8B:
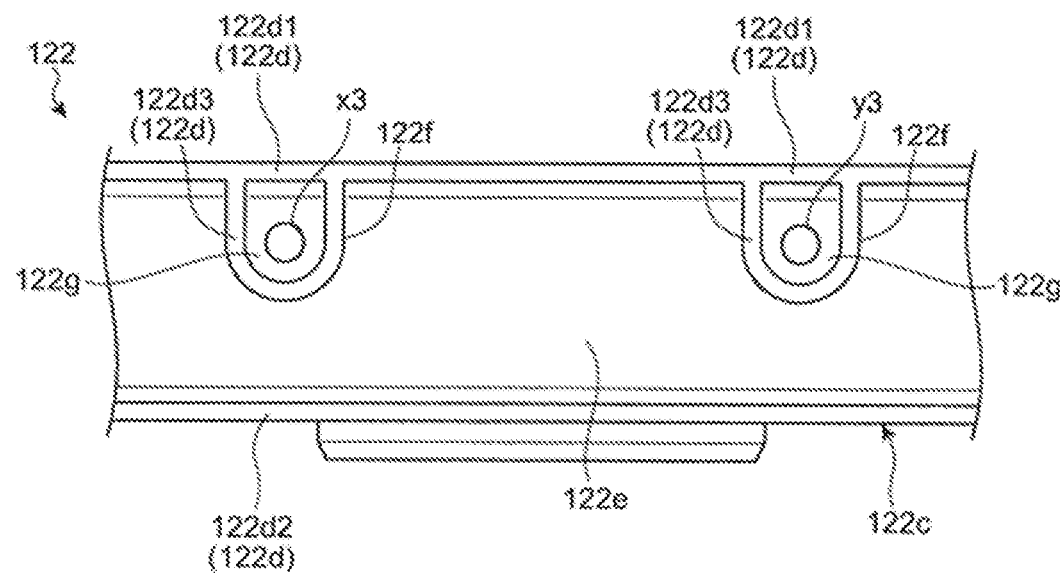

As shown in FIGS. 8A and 8B, a circumferential groove 122*e* is provided on the outer peripheral surface 122*d* of the outer cylindrical part 122*c* of the annular member 122, and side wall parts 122*d*1 and 122*d*2 are left on both sides in the axial direction of the circumferential groove 122*e*.

Weirs 122*f*, 122*f* surrounding the opening parts x3 and y3 are provided around the opening parts x3 and y3 opening in the circumferential groove 122*e* of the annular member 122 and formed by a continuous surface with the side wall part 122*d*1 forming the circumferential groove 122*e*. Moreover, concave communicating parts 122*g*, 122*g* are formed around the opening parts x3 and y3 by these weirs 122*f*, 122*f*.

Figure 9:
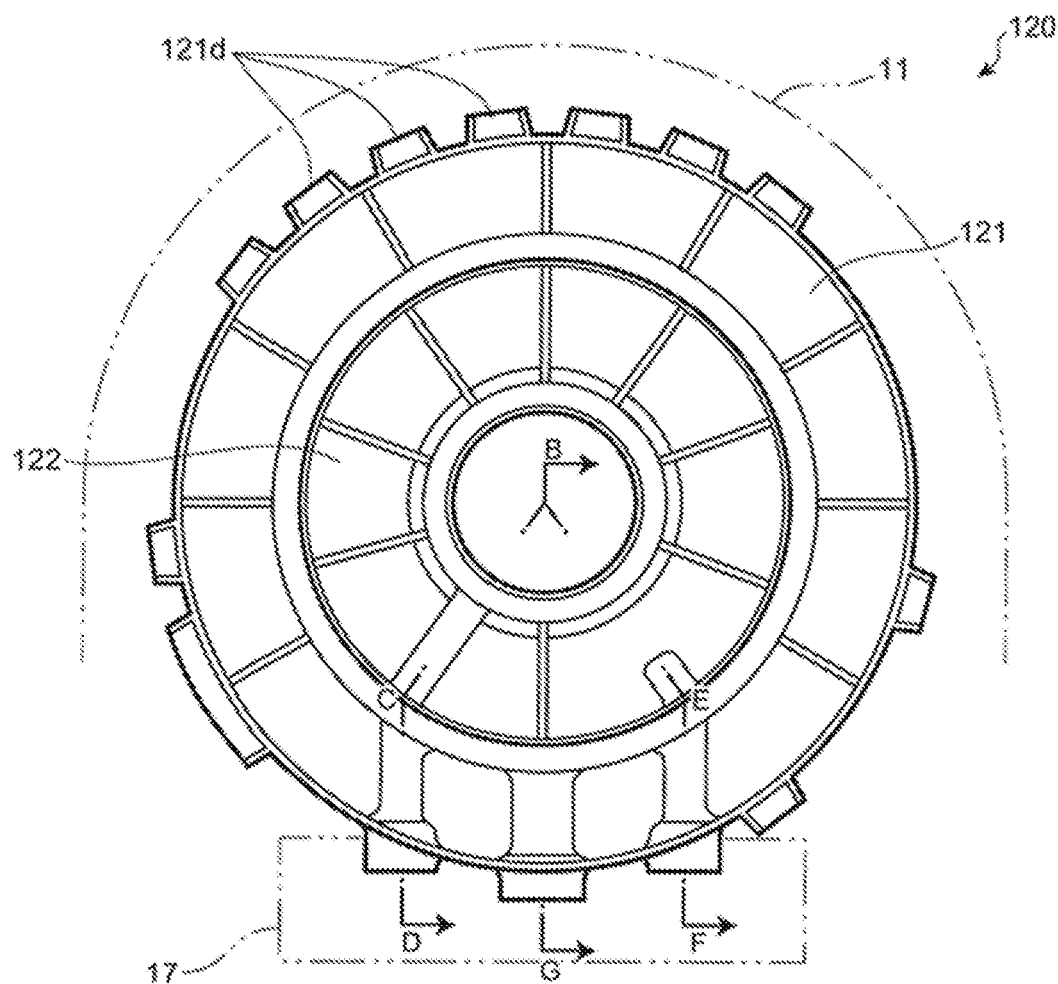
FIG. 9 is an A-A sectional view of FIG. 1.
Figure 10:
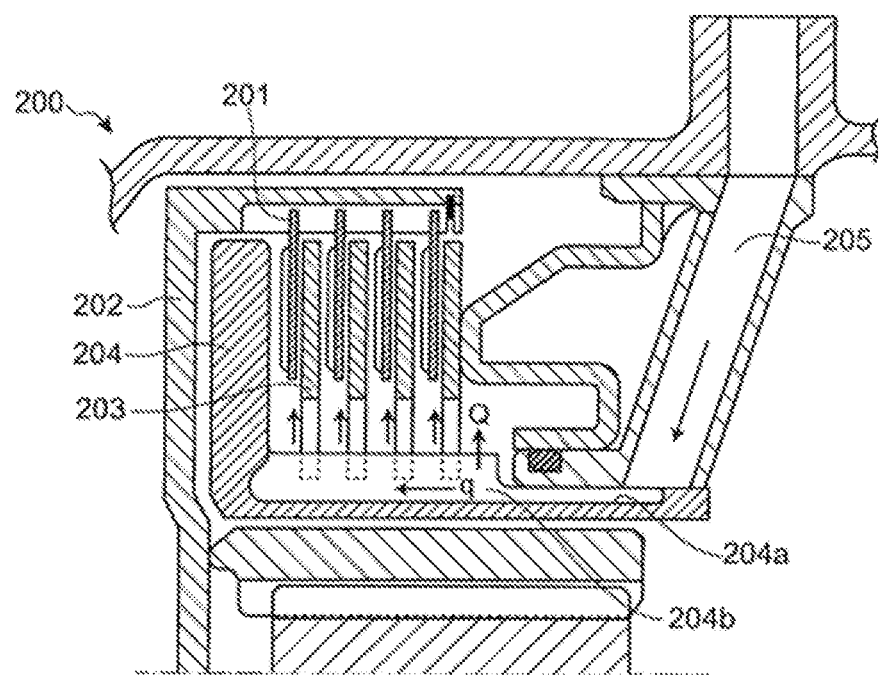
FIG. 10 is an enlarged cross-sectional view of a main part of a start brake showing a conventional example of a transmission.

As shown in FIG. 9, the fixed side unit 120 is formed by press-fitting the fixed side holding member 121 and the annular member 122.

Then, as shown in FIG. 3 to FIG. 5, by press-fitting the inner peripheral surface of the inner cylindrical part 121*a* of the fixed side holding member 121 and the outer peripheral surface 122*d* of the outer cylindrical part 122*c* of the annular member 122, an annular space P in the oil-tight state is formed between the inner peripheral surface of the inner cylindrical part 121*a* of the fixed side holding member 121 and the circumferential groove 122*e* of the annular member 122, and the annular space P is spread over the whole circumference of the fixed side unit 120.

Moreover, the communicating parts 122*g*, 122*g* are formed between the inner peripheral surface of the inner cylindrical part 121*a* of the fixed side holding member 121 and an inner space (opening parts x3 and y3 sides) of the weirs 122*f*, 122*f* that is partitioned from the annular space P of the annular member 122.

Furthermore, the engagement oil passage X is formed by the oil passage x' of the fixed side holding member 121 and the oil passage x" of the annular member, and the engagement oil passage Y is formed by the oil passage y' of the fixed side holding member 121 and the oil passage y" of the annular member.

Therefore, the engagement oil passage X and the release oil passage Y are formed over the fixed side holding member 121 and the annular member 122, the upstream parts x' and y' of the oil passages are formed by the fixed side holding member 121, and the downstream parts x" and y" of the oil passages are formed by the annular member 122, respectively.

On the other hand, lubricating oil passages Z, P, and 121*f*, 121*f* are formed by the inflow oil passage Z of the fixed side holding member 121, the annular space P, and the oil discharge holes 121*f*, 121*f*.

Then, the upstream parts x' and y' and the downstream parts x"and y" communicate with the communicating parts 122*g*, 122*g* in the annular space P, the communicating parts 122*g*, 122*g* and the annular space P are formed in a partitioned and separated state by the weirs 122*f* and 122*f* of the annular member 122.

The fixed side unit 120 is fixed on the transmission case 11 by the spline teeth 121*d*, 121*d* of the fixed side holding member 121, and the boss parts x1', y1', and z1' are connected with a control valve 17 so as to supply hydraulic pressure to the oil passages.

Next, a circulation route of lubricating oil and an inflow route of the piston hydraulic oil according to the present embodiment will be described with reference to FIG. 3 to FIG. 5. Arrows a, b, and c in FIG. 3 to FIG. 5 show flows of lubricating oil.

After engaging the second brake BR2, the second brake BR2 executes a slip control. That is, while the rotation side friction plates 101*a*, 101*a* and the fixed side friction plates 101*b*, 101*b* are engaged after being in a slip state, their engagement is completely released after being in the slip state following the engagement state. By the slip control, smaller hydraulic pressure than the engagement hydraulic pressure required to engage the rotation side friction plates 101*a*, 101*a* and the fixed side friction plates 101*b*, 101*b* completely is supplied to a hydraulic chamber x, and the rotation side friction plates 101*a*, 101*a* and the fixed side friction plates 101*b*, 101*b* are engaged insufficiently. Because of this, when executing the slip control, the rotation side friction plates 101*a*, 101*a* slidingly contact with the fixed side friction plates 101*b*, 101*b* in the rotation direction, and frictional heat is generated between the both friction plates 101*a*, 101*a* and 101*b*, 101*b*. According to the present embodiment, the second brake BR2 is configured so as to execute the slip control when starting propulsion of the vehicle from a stop, and thus the slip control may be executed often.

When engaging the second brake BR2, as shown by an arrow a in FIG. 3, the piston hydraulic oil is supplied to the engagement hydraulic chamber x via the engagement oil passage X, the friction plates 101*a*, 101*a* and 101*b*, 101*b* are engaged by the piston 102, and the second brake BR2 is engaged.

When releasing the second brake BR2, as shown an arrow b in FIG. 4, the piston hydraulic oil is supplied to the release hydraulic chamber y via the release oil passage Y, and the piston 102 is moved to the direction to release the friction plates 101*a*, 101*a* and 101*b*, 101*b*.

When lubricating the second brake BR2, as shown by an arrow c in FIG. 5, via the inflow oil passage Z, lubricating oil of the friction plate is introduced to the annular space P that is formed between the inner cylindrical part 121*a* of the fixed side holding member 121 and the circumferential groove 122e of the annular member 122. Then, this lubricating oil is spread over the whole circumference along the circumferential groove 122e and also supplied from the oil discharge holes 121f, 121f, which are provided on the spline part 121e of the inner cylindrical part 121a of the fixed side holding member 121, to the friction plates 101a, 101a and 101b, 101b, which are positioned at the outside of the spline part 121e.

At this time, the annular space P is formed in the oil-tight state, and approximately the entire amount of the introduced lubricating oil without exception can be reliably supplied to the friction plates 101a, 101a and 101b, 101b. Then, as shown in FIGS. 6A and 6B, since the oil discharge holes 121f, 121f are provided over the whole circumference and also provided at different positions in the axial direction, lubricating oil can be supplied throughout the friction plates 101a, 101a and 101b, 101b that are provided alternately stacked in the axial direction.

Moreover, although the hydraulic oil for engaging and releasing crosses the annular space P, since the annular space P, the engagement oil passage X, and the release oil passage Y are separated by the weirs 122f and 122f surrounding the communicating parts 122g and 122g of the engagement oil passage X and the release oil passage Y, lubricating oil introduced to the annular space P avoids mixing with these hydraulic oils.

As described above, since the engagement oil passage X, the release oil passage Y, and the annular space P, which are three oil passages having different purposes, are formed by two oil passages X and Y formed along the radial direction having different positions in the circumferential direction and the oil passage P circling in the circumferential direction, and the oil passages are provided without running into each other, the hydraulic oil for engaging and the hydraulic oil for releasing, and the lubricating oil of the friction plate are separated without mixing.

INDUSTRIAL APPLICABILITY

Consequently, according to the present invention, by efficiently performing the supply of lubricating oil to the brake device of the transmission, both the improvement of fuel economy and the maintenance of durability of the friction plates can be achieved, and it is possible to be suitably used in manufacturing technology fields of vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

EXPLANATION OF REFERENCE CHARACTERS

10 Automatic transmission (transmission)
BR2 Second brake (brake device)
101a, 101a Rotation side friction plates
101b, 101b Fixed side friction plates
102 Piston
110 Rotation side holding member
120 Fixed side unit
121 Fixed side holding member
121a Inner cylindrical part of fixed side holding member (cylindrical part)
121f, 121f Oil discharge hole
122g, 122g Communicating part
122 Annular member
122e Circumferential groove (circumferential direction groove)
122f, 122f Weir (wall part)
P Annular space
X Engagement oil passage (hydraulic oil passage of piston)
x', y' Upstream part
x'', y'' Downstream part
Y Release oil passage
Z Inflow oil passage

We claim:

1. A brake device of a transmission comprising:
a rotatable cylindrical shape rotation side holding member for holding an outer circumferential part of a rotation side friction plate at an inner peripheral side of the rotatable cylindrical shape rotation side holding member; and
a non-rotatable fixed side holding member having a cylindrical part being arranged at an inner side of the non-rotatable fixed side holding member for holding inner circumferential parts of fixed side friction plates spaced apart from each other at an outer peripheral side of the cylindrical part,
wherein the non-rotatable fixed side holding member has an inflow oil passage that supplies lubricating oil from an outside in a radial direction to the inner side,
wherein an annular space communicating with the inflow oil passage is provided inside of the cylindrical part of the non-rotatable fixed side holding member,
wherein an oil discharge hole for supplying lubricating oil, which is flowed into the annular space, to the friction plates, is provided on the cylindrical part of the non-rotatable fixed side holding member,
wherein an annular member is fitted into the inside of the cylindrical part of the non-rotatable fixed side holding member,
wherein a circumferential direction groove is provided on an inner peripheral surface of the cylindrical part or an outer peripheral surface of the annular member, and
wherein the annular space is formed in an oil-tight state between the inner peripheral surface of the cylindrical part and the outer peripheral surface of the annular member.

2. The brake device of a transmission according to claim 1, comprising:
a piston for pressing the friction plates,
wherein a hydraulic oil passage of the piston is provided on the non-rotatable fixed side holding member and the annular member, and
wherein an upstream part of the hydraulic oil passage is formed by the non-rotatable fixed side holding member and a downstream part of the hydraulic oil passage is formed by the annular member, and the upstream part, and the downstream part of the hydraulic oil passage communicate with the annular space in a separated state.

3. The brake device of a transmission according to claim 2,
wherein the non-rotatable fixed side holding member and the annular member are integrated by press-fitting.

4. The brake device of a transmission according to claim 3,
wherein a communicating part for communicating with the upstream part and the downstream part of the hydraulic oil passage in the annular space is provided on a surface of a side, on which the circumferential direction groove is provided among the inner peripheral surface of the cylindrical part of the non-rotatable fixed side holding member and the outer peripheral surface of the annular member, and wherein a wall part is provided on the communicating part for partitioning between the hydraulic oil passage and the annular space.

5. The brake device of a transmission according to claim 2, wherein the hydraulic oil passage has an engagement oil passage for engaging the friction plates and a release oil passage for releasing the friction plates, and wherein the engagement oil passage and the release oil passage are arranged at different positions in a circumferential direction.

6. The brake device of a transmission according to claim 1, wherein the brake device is a start brake provided on the transmission.

* * * * *